(12) United States Patent
Mizuno (10) Patent No.: US 9,977,321 B2
(45) Date of Patent: May 22, 2018

(54) THREE-DIMENSIONAL SCREEN STRUCTURE AND THREE-DIMENSIONAL IMAGE GENERATING SYSTEM

(71) Applicant: SONY CORPORATION, Tokyo (JP)

(72) Inventor: Tomomasa Mizuno, Anagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/323,479

(22) PCT Filed: Apr. 28, 2015

(86) PCT No.: PCT/JP2015/002286
§ 371 (c)(1),
(2) Date: Jan. 3, 2017

(87) PCT Pub. No.: WO2016/013137
PCT Pub. Date: Jan. 28, 2016

(65) Prior Publication Data
US 2017/0146898 A1 May 25, 2017

(30) Foreign Application Priority Data
Jul. 23, 2014 (JP) .................................. 2014-149817

(51) Int. Cl.
| G03B 21/56 | (2006.01) |
| G03B 21/62 | (2014.01) |
| G02B 27/22 | (2018.01) |
| G03B 21/606 | (2014.01) |
| G03B 21/20 | (2006.01) |
| H04N 9/31 | (2006.01) |

(52) U.S. Cl.
CPC ....... *G03B 21/606* (2013.01); *G02B 27/2271* (2013.01); *G03B 21/2013* (2013.01); *H04N 9/3147* (2013.01); *G03B 21/56* (2013.01); *G03B 21/62* (2013.01)

(58) Field of Classification Search
CPC ...... G03B 21/56; G03B 21/608; G03B 21/62; G03B 21/606; G02B 27/2271; G02B 27/2278; G02B 27/2292; H04N 9/3147
USPC .................................................. 359/452, 451
See application file for complete search history.

(56) References Cited

U.S. PATENT DOCUMENTS

| 7,911,692 B2* | 3/2011 | Okamoto ............... G03B 21/56 359/449 |
| 2008/0239243 A1* | 10/2008 | Hasegawa .............. G03B 21/56 353/30 |

FOREIGN PATENT DOCUMENTS

| JP | 10213851 A | * | 8/1998 |
| JP | 2006138980 A | * | 6/2006 |
| JP | 2008-033202 A | | 2/2008 |
| JP | 2013-017161 A | | 1/2013 |

* cited by examiner

*Primary Examiner* — Ryan Howard
(74) *Attorney, Agent, or Firm* — Chip Law Group (57) ABSTRACT

A three-dimensional screen structure is a three-dimensional screen structure on which image light projected from an image light source is incident. The three-dimensional screen structure includes particles and a bind unit. The particles are three-dimensionally disposed and capable of transmitting or reflecting the image light. The bind unit binds the particles.

7 Claims, 5 Drawing Sheets

THREE-DIMENSIONAL SCREEN STRUCTURE AND THREE-DIMENSIONAL IMAGE GENERATING SYSTEM

CROSS REFERENCE TO RELATED APPLICATIONS

This application is a U.S. National Phase of International Patent Application No. PCT/JP2015/002286 filed on Apr. 28, 2015, which claims priority benefit of Japanese Patent Application No. JP 2014-149817 filed in the Japan Patent Office on Jul. 23, 2014. Each of the above-referenced applications is hereby incorporated herein by reference in its entirety.

TECHNICAL FIELD

The present technology relates to a three-dimensional image generating system that generates a three-dimensional image, and to a three-dimensional screen structure that displays a three-dimensional image in the three-dimensional image generating system.

BACKGROUND ART

A typical holography technology is, for example, a technology of causing reference light and signal light to interfere with each other and recording the interference light on a hologram recording medium. In other words, at the time of recording, a light and dark pattern of the interference light, i.e., an intensity and a phase thereof are recorded on a recording medium. At the time of reproduction of the signal light, the recording medium is irradiated with the reference light, and thus diffracted light occurs from the recording medium. An observer can see the diffracted light as a stereoimage.

Patent Document 1 discloses an apparatus that irradiates a detector such as an image sensor with reproduction light to obtain a digital image at the time of reproduction of the signal light (see, for example, paragraphs [0004] to [0007] of Patent Document 1).

Further, there is also a so-called digital holography technology of acquiring the above-mentioned interference light as a digital image by using a solid-state imaging device. In the digital holography technology, data of the intensity and phase of the interference light is handled as digital data of an interference fringe image, and image processing is also necessary at least at the time of reproduction. Consequently, the digital holography technology is disadvantageous in a huge amount of data and a huge amount of data processing.

For another means of obtaining a stereoimage, Patent Document 2 discloses a display system using a screen of mist or water droplets. The display system includes a generator of a screen of mist or water droplets, and a projector that projects 3D content onto the mist or water droplets generated by the generator (see, for example, paragraph [0019] of Patent Document 2).

Patent Document 1: Japanese Patent Application Laid-open No. 2013-178860
Patent Document 2: Japanese Patent Application Laid-open No. 2013-17161

SUMMARY OF INVENTION

Problem to be Solved by the Invention

However, the system described in Patent Document 2 needs to use a screen of mist or water droplets. Depending on a method of spraying liquid or on an environment around the system, reproduction accuracy of image light largely varies, and it is very difficult to secure a constant quality.

For those reasons described above, it is an object of the present technology to provide a three-dimensional image generating system capable of obtaining a reproduction image having high reproduction accuracy and a constant quality, and a three-dimensional screen structure used in the three-dimensional image generating system.

Means for Solving the Problem

In order to achieve the object described above, according to the present technology, there is provided a three-dimensional screen structure that is a three-dimensional screen structure on which image light projected from an image light source is incident. The three-dimensional screen structure includes particles and a bind unit.

The particles are three-dimensionally disposed and capable of transmitting or reflecting the image light.

The bind unit binds the particles.

Since the particles are configured to be bound by the bind unit, the positions of the particles are fixed. Consequently, the three-dimensional screen structure can obtain a reproduction image having high reproduction accuracy and a constant quality, compared with a screen of sprayed droplets.

The particles may be disposed at random.

As a result, the image light is projected onto the particles even when the image light source is located at any position.

The particles may be disposed regularly.

As a result, the three-dimensional screen structure is easily manufactured.

The particles may be disposed such that the number of particles per unit volume is increased toward the inside of the three-dimensional screen structure from a surface thereof.

As a result, a large amount of light from the image light source can be reflected on the particles, and light use efficiency can be enhanced.

The bind unit may include connecting bodies that are each formed into a column shape or a rod shape.

The bind unit may be a transparent body that fills a space among the particles.

In other words, because of the absence of rod- or column-shaped connecting bodies, the travel of the image light is not hindered by the bind unit within the three-dimensional screen structure, and a high image quality can be achieved.

The particles and the bind unit may be made of a photo-curable resin.

As a result, the three-dimensional screen structure can be manufactured with a 3D printer.

According to the present technology, there is provided a three-dimensional image generating system including: one or more image light sources capable of projecting image light; and the three-dimensional screen structure described above.

The one or more image light sources may be image light sources that respectively project the image light onto the three-dimensional screen structure from different directions.

An observer moves within a predetermined range around the three-dimensional screen structure, and can thus see a three-dimensional image including three-dimensional information.

Effects of the Invention

As described above, according to the present technology, it is possible to obtain a reproduction image having high reproduction accuracy and a constant quality.

It should be noted that the effects described herein are not necessarily limited and may be any of the effects described in this disclosure.

MODE(S) FOR CARRYING OUT THE INVENTION

Hereinafter, embodiments of the present technology will be described with reference to the drawings.

First Embodiment

Figure 1A:
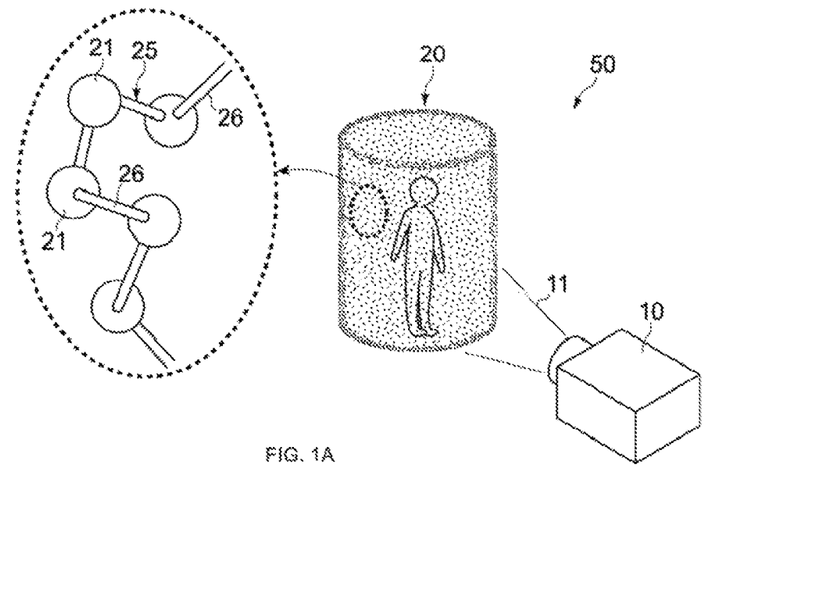
FIG. 1A is a diagram conceptually showing a three-dimensional image generating system according to a first embodiment of the present technology. Part
Figure 1B:
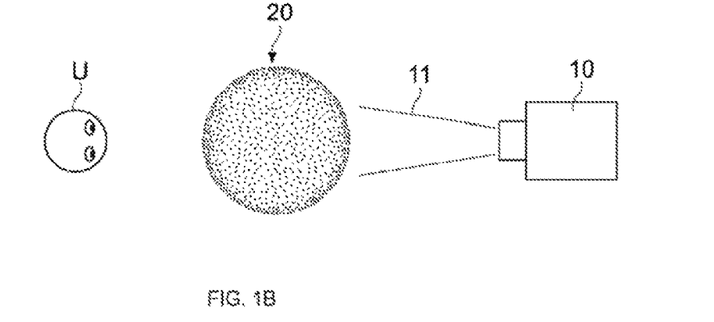
FIG. 1B is a plan view of the three-dimensional image generating system when viewed from the top.

FIG. 1A is a diagram conceptually showing a three-dimensional image generating system according to a first embodiment of the present technology. FIG. 1B is a plan view of the three-dimensional image generating system 50 when viewed from the top. The three-dimensional image generating system 50 includes a projector 10, which serves as an image light source, and a three-dimensional screen structure 20 onto which image light 11 from the projector 10 is projected.

For the projector 10, a projector having a general structure and function is used. Image data projected from the projector 10 may be a general 2D image. The "image" used herein includes both meanings of a still image and a moving image.

The three-dimensional screen structure 20, which is shown in a partially enlarged manner in the figure, includes a plurality of particles 21 and a bind unit 25 that binds those particles 21. The term "bind" means connect, joint, and the like.

The three-dimensional screen structure 20 includes numerous or an infinite number of particles 21. The overall shape (outer shape) of the three-dimensional screen structure 20 may be any shape. FIG. 1A and FIG. 1B show a cylindrical shape as an example.

The particles 21 have a structure imitating mist or water droplets, for example. The particles 21 are three-dimensionally disposed at random. The particles 21 are each formed into a spherical shape, for example. However, the shape is not limited to the spherical shape and may be a polyhedron shape or other random particle shapes.

The bind unit 25 includes a plurality of connecting bodies (or coupling bodies) 26. The connecting bodies 26 are each formed into the shape of a rod or column and connect the particles 21. The multiple, e.g., two connecting bodies 26 extend from each of the particles 21.

It should be noted that a base (not shown) may be provided under the three-dimensional screen structure 20.

The overall view of the three-dimensional screen structure 20 in FIG. 1A and FIG. 1B shows that the density (degree of scattering) of the particles varies depending on areas, which is for the purpose of easy understanding of the figure. Actually, the degree of scattering is desirably as uniform as possible.

Figure 2:
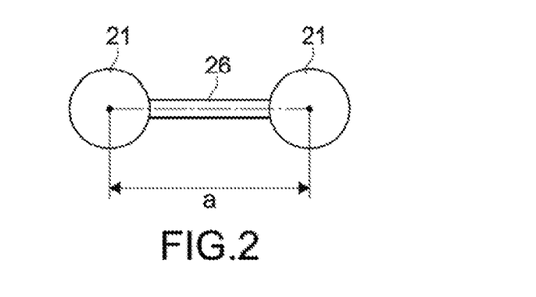
FIG. 2 is a diagram for describing sizes of particles and a bind unit.

FIG. 2 is a diagram for describing the sizes of the particles 21 and the bind unit 25.

The size (e.g., volume) of the particle 21 is about $1*10^{-4}$ [cm$^3$] to 1 [cm$^3$], for example, and is 0.03 [cm$^3$], for example.

A pitch a between the particles 21 is about 0.6 [mm] to 10 [cm], for example.

The thickness of the connecting body 26 is about 0.1 [mm] to several centimeters [cm], for example.

Those sizes can be appropriately changed depending on the size of the three-dimensional screen structure 20.

The three-dimensional screen structure 20 is formed with use of an injection molding apparatus or a 3D printer (molding apparatus).

A three-dimensional screen structure having a relatively large size may be manufactured with an injection molding apparatus, for example. A plurality of parts configuring a three-dimensional screen structure is manufactured with an injection molding apparatus, for example, and then combined with one another. Thus, a three-dimensional screen structure can be produced.

A three-dimensional screen structure having a relatively small size, particularly, including microstructural particles and bind unit may be manufactured with a 3D printer. For the 3D printer, for example, apparatuses described in Japanese Patent Application Laid-open Nos. 2012-040757, 2012-106437, 2012-240216, 2013-207060, 2013-059983, and the like may be used.

The three-dimensional screen structure 20 according to this embodiment is desirably of a transmission type. The transmission type refers to a type in which the particles 21 transmit the image light 11 from the projector 10. However, the type is not necessarily limited to the transmission type and may be a reflection type. That is, the reflection type is a type in which the particles 21 reflect the image light 11 from the projector 10 and an observer U observes the reflected image light 11.

A material of the particles 21 is typically a resin. For example, at least one of PEEK, PC, PMMA, POM, PU, PET, PA, PCTFE, PTFE, FEP, PFA, ETFE, PVDF, soft PVC, PVA, ABS, PP, PMM, and APS is selectively used. Further, the resin material may be coated with a protective film, a color film, or the like. In the case of the reflection type, the resin material itself or a surface film thereof desirably has a white color (for example, (R, G, B)=(255, 255, 255)).

The same material as the material of the particles 21 can also be selectively used for a material of the bind unit 25. In one three-dimensional screen structure 20, the material of the particles 21 and the material of the bind unit 25 may be different from each other.

When the three-dimensional screen structure 20 is formed with use of a 3D printer and when the three-dimensional screen structure 20 is of the transmission type, the material of the particles 21 and bind unit 25 are typically a transparent or semi-transparent photo-curable resin.

The terms "transparent" and "semi-transparent" mean a state where light passing through the material is visible by human eyes. Here, representation of a quantitative difference between "transparent" and "semi-transparent" is meaningless, and "transparent" and "semi-transparent" only need to be different from each other in light transmissivity.

In the case of the reflection type, the photo-curable resin is obviously opaque, or a transparent or semi-transparent photo-curable resin is provided with colored coating.

FIG. 1B shows a layout relationship between the observer U, the three-dimensional screen structure 20, and the projector 10. The three-dimensional screen structure 20 in this example is of the transmission type. In other words, the particles 21 of the three-dimensional screen structure 20 are transparent or semi-transparent. In this case, the projector 10 and the observer U typically have a positional relationship in which the projector 10 and the observer U face each other centering on the three-dimensional screen structure 20.

When the image light 11 projected from the projector 10 is incident on the inside of the three-dimensional screen structure 20, the image light 11 passes through the inside of each of the particles 21 (is refracted on the surfaces of the particles 21 to pass through the inside) or is totally reflected on the surfaces of the particles 21. In other words, a random phase difference occurs in a depth direction of the three-dimensional screen structure 20 (particularly in a traveling direction of the image light 11 from the projector 10). In such a manner, phase information is imparted to an image, and thus a projected image includes three-dimensional information. This enables the observer U to see the image light 11, which is projected within the three-dimensional screen structure 20, as an image having a three-dimensional depth.

Further, since the image light 11 is refracted and totally reflected as described above, even when the observer U moves around the three-dimensional screen structure 20 within a range of about ±30°, for example, the observer U can see an image having a depth, which is projected within the three-dimensional screen structure 20. Note that in this case the image looks slightly different in accordance with a position of the observer U.

In this embodiment, when the structure is transparent or semi-transparent, a video representation like an image projected in the air can be achieved. In general, a hologram video is created by a method of rotating a display at high speed or a method of applying a video to mist or water droplets. Those methods need a large-scale apparatus so as to create an image displaying medium. In particular in a rotary display or the like, in order that observers perceive as if a video were projected in the air, it is necessary to create image data especially therefor. In this regard, this embodiment does not need processing of image data.

As described above, since the numerous particles 21 are three-dimensionally disposed and configured to be bound by the bind unit 25, the positions of the numerous particles 21 are fixed. Consequently, the three-dimensional screen structure 20 can obtain a reproduction image having high reproduction accuracy and a constant quality, compared with a screen of sprayed droplets.

Since the numerous particles 21 are disposed at random in this embodiment, the image light 11 is projected onto the numerous particles 21 even when the projector 10 is located at any position. Consequently, the projector 10 can be disposed at an arbitrary position, and the degree of freedom in design of the three-dimensional image generating system 50 is enhanced.

Further, in this embodiment, an image can be projected not onto a plane or a surface of an object as in projection mapping conventionally performed, but inside the object. Thus, a new video representation exceeding the projection mapping can be expected.

Figure 3:
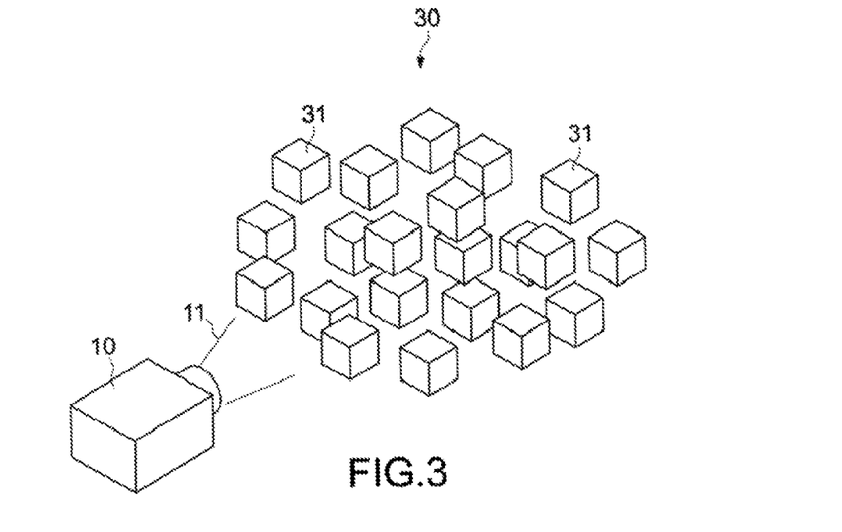
FIG. 3 is a perspective view showing a modified example of the three-dimensional screen structure according to the first embodiment.

For example, as shown in FIG. 3, a three-dimensional screen structure 30 may include a plurality of particles 31 having a block shape. It should be noted that a bind unit is not shown in the figure. The block shape is a shape of a cube or a cuboid. In this case, the particles 31 are disposed to have a posture in which certain surfaces thereof are oriented to a certain direction (here, in an incident direction of the image light 11). The particles 31 are disposed at random. The shape of the particle 31 is set to be a block shape such as a cube, a cuboid, or the like as described above, and thus projection mapping in a three-dimensional shape is enabled.

Second Embodiment

Figure 4:
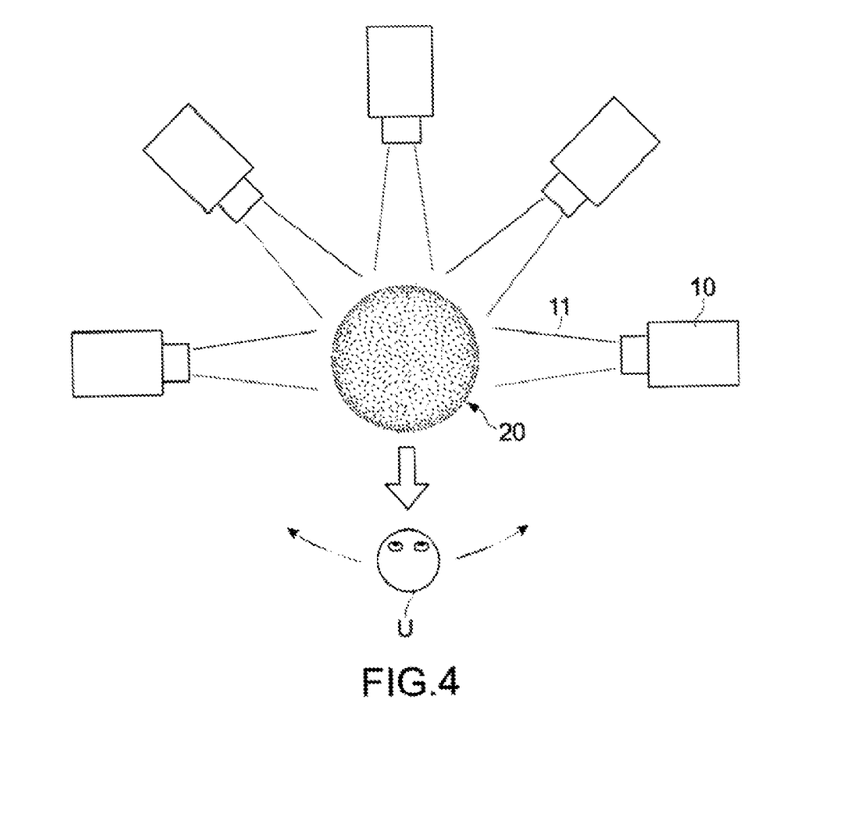
FIG. 4 is a plan view schematically showing, as a second embodiment, a three-dimensional image generating system including a plurality of projectors.

FIG. 4 is a plan view schematically showing, as a second embodiment, a three-dimensional image generating system including a plurality of projectors 10.

In this example, for example, five projectors 10 are disposed around a three-dimensional screen structure 20 at regular intervals and developed within a range of 180°. Traveling directions of light from those projectors 10 (directions of main optical axes) are different from one another. The projectors 10 are disposed such that all the light is oriented to the center of the three-dimensional screen structure 20. Further, pieces of image data projected from the respective projectors 10 each have parallax corresponding to the layout relationship of the projectors 10. Consequently, a three-dimensional image including three-dimensional information is projected onto the three-dimensional screen structure 20. When changing a position of observation (angle of observation to the three-dimensional screen structure 20) around the three-dimensional screen structure 20, an observer U can see the three-dimensional image.

In the example shown in FIG. 4, the plurality of projectors 10 is disposed on the same plane, but may be three-dimensionally disposed. Also in this case, the plurality of projectors 10 three-dimensionally disposed projects the image light having parallax so as to enable replication of images corresponding to the layouts of the projectors 10.

Obviously, the number of projectors 10 is not limited to five. The number of projectors 10 may be less than five or may be six or more.

Third Embodiment

Figure 5:
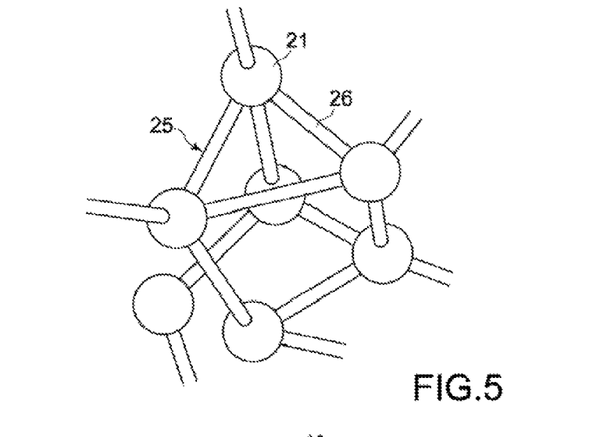
FIG. 5 is an enlarged view of another example of the three-dimensional screen structure as a third embodiment.

FIG. 5 is an enlarged view of another example of the three-dimensional screen structure as a third embodiment. In this embodiment, three or more connecting bodies 26 extend from one particle 21. The particles 21 are disposed at random. The bind unit 25 scarcely contributes to generation of images, and thus the volume thereof is desirably as small as possible. However, in view of the rigidity among the particles 21, as the number of connecting bodies 26 is larger, the synthesis is higher. In this embodiment, priority is given to the rigidity among the particles 21 and eventually to the rigidity of the three-dimensional screen structure, and the volume of the bind unit 25 is thus increased.

Fourth Embodiment

Figure 6:
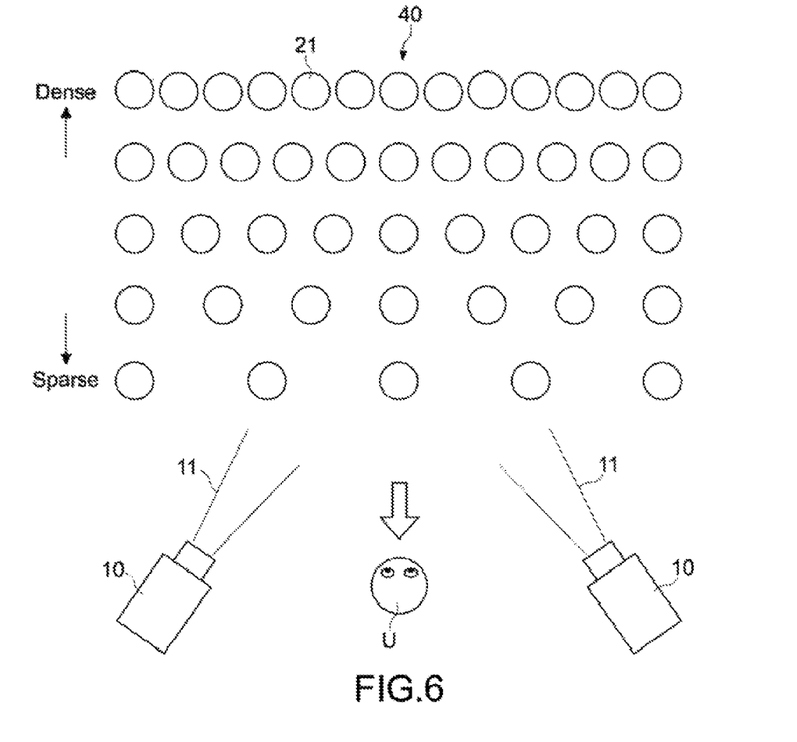
FIG. 6 shows another example of the three-dimensional screen structure as a fourth embodiment.

FIG. 6 shows another example of the three-dimensional screen structure as a fourth embodiment. In a three-dimensional screen structure 40 according to this embodiment, particles 21 are disposed not at random but regularly. Specifically, those particles 21 are disposed such that the number of particles 21 per unit volume (hereinafter, described as "particle density" as appropriate) is increased toward the inside of the three-dimensional screen structure from the surface thereof. This figure is a conceptual diagram in plan view, and thus shows that the particles 21 are two-dimensionally disposed. Actually, however, the particles 21 are three-dimensionally disposed. It should be noted that illustration of the bind unit is omitted in FIG. 6.

For example, projectors 10 are disposed such that the image light 11 is incident from directions of a low particle density out of the surfaces of the three-dimensional screen structure 40. An observer U can see an image, which is generated in the three-dimensional screen structure 40, as reflected light.

In this embodiment, as the depth of the image light 11 from the projectors 10 with respect to the three-dimensional screen structure 40 is larger, a probability of reflection of the image light 11 is increased. Thus, light use efficiency can be enhanced. As a result, a three-dimensional image with high luminance can be generated.

Fifth Embodiment

Figure 7A:
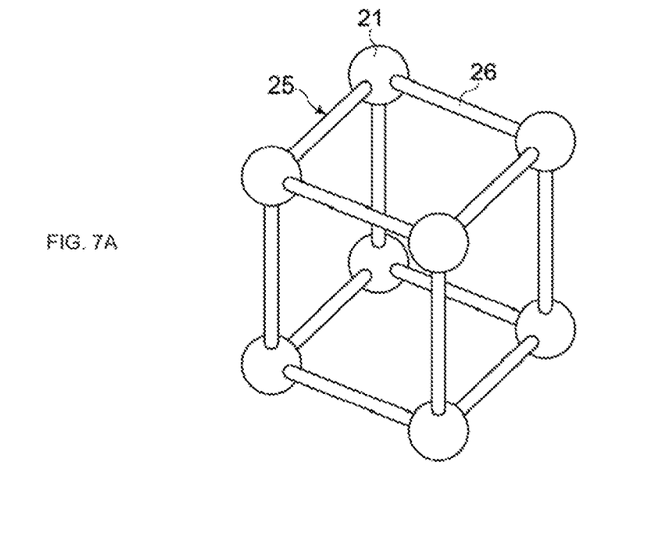
FIG. 7A is an enlarged view of a part of a three-dimensional screen structure.

FIG. 7A is an enlarged view of a part of a three-dimensional screen structure. Particles 21 and connecting bodies 26 have a structure like a regular crystal lattice. For example, the particles 21 are provided at respective vertices of a cubic lattice, and the connecting bodies 26 are provided as respective sides of the cubic lattice. With one cubic lattice as a unit, a three-dimensional screen structure constituted of the numerous cubic lattices can be formed.

Figure 7B:
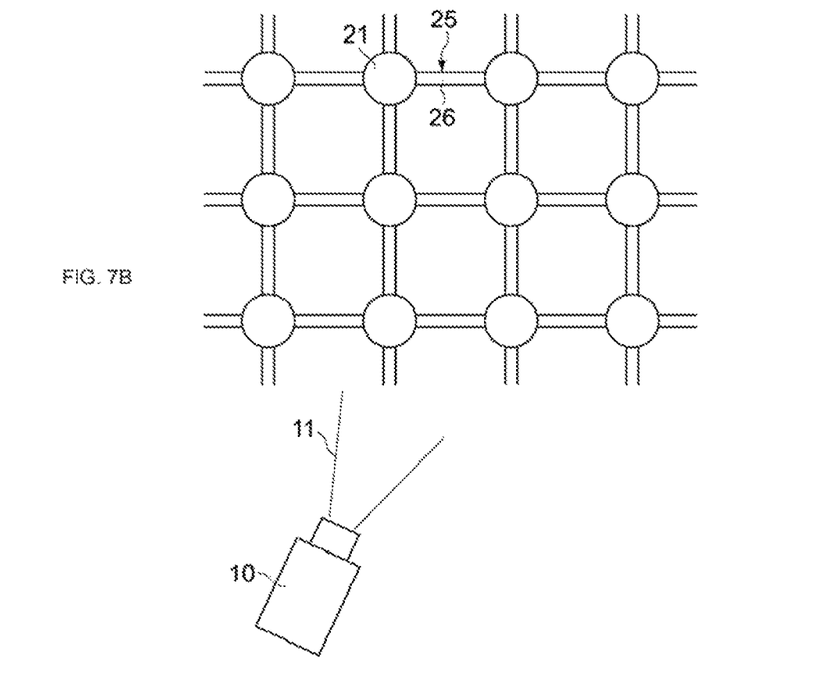
FIG. 7B is a plan view of a three-dimensional image generating system including the three-dimensional screen structure when viewed from the top.

FIG. 7B is a plan view of the three-dimensional image generating system including a three-dimensional screen structure 0 when viewed from the top. A projector 10 is disposed such that a traveling direction of image light 11 from the projector 10 (a direction of a main optical axis) is oblique to a length direction of the connecting bodies 26. The direction of the main optical axis of the image light 11 from the projector 10 is a direction in which the light from the projector 10 can directly reach as many particles 21 as possible. Such a three-dimensional image generating system enables generation of an image with depth. Obviously, multiple projectors 10 may be provided.

Both of the transmission type and the reflection type may be applicable to the three-dimensional screen structure. Obviously, multiple projectors 10 may be provided.

It should be noted that in this embodiment, the unit of lattice is a cube, but may be a cuboid.

Sixth Embodiment

Figure 8:
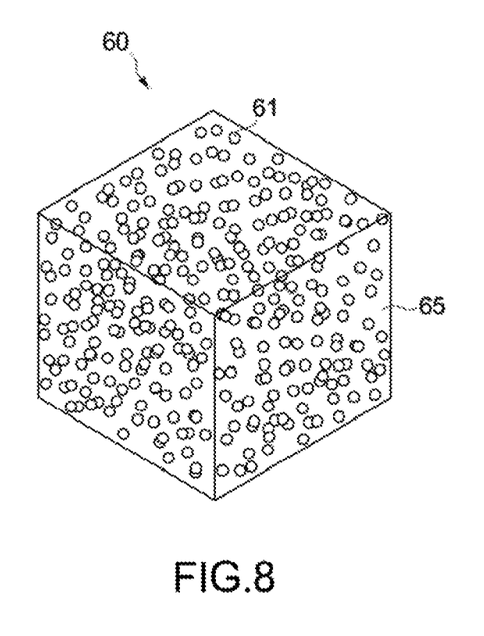
FIG. 8 shows another example of the three-dimensional screen structure as a sixth embodiment.

FIG. 8 shows another example of the three-dimensional screen structure as a sixth embodiment. A three-dimensional screen structure 60 includes a transparent body 65 as a bind unit. The transparent body 65 fills a space among particles 61. The transparent body 65 is made of a photo-curable resin material that can be formed with use of a 3D printer. The three-dimensional screen structure 60 is constituted such that, for example, transparent, semi-transparent, and opaque particles 61 are scattered within the transparent body 65.

Light transmissivity of the particles 61 and light transmissivity of the transparent body 65 are different from each other. The transmissivity of the transparent body 65 is desirably higher than the transmissivity of the particles 61.

According to the structure as described above, because of the absence of rod- or column-shaped connecting bodies of the embodiments described above, the travel of the image light is not hindered by the bind unit within the three-dimensional screen structure 60, and high image quality can be achieved.

Other Embodiments

The present technology is not limited to the embodiments described above and can achieve various other embodiments.

For example, each of the particles of the three-dimensional screen structure may have a liquid crystal device structure. For example, each of the particles includes liquid crystal, a container structure that houses the liquid crystal, an electrode that is provided to the container structure and operates the liquid crystal, and the like. An electric line is formed on the surface or inside of the connecting body. A unique address is assigned to each of the particles.

For example, when the three-dimensional screen structure is manufactured with a 3D printer, using at least one of the 3D printers disclosed in the above official gazettes enables a metal film and wiring to be formed within the three-dimensional screen structure 20.

With such a three-dimensional screen structure including liquid crystals, the particles can respectively control the light transmissivity, and thus a variety of three-dimensional images can be generated.

In the feature portions of the embodiments described above, at least two feature portions can be combined with each other. For example, the three-dimensional screen structure 60 shown in FIG. 8 and the structure of particles shown in FIG. 3, 4, or 6, for example, may be combined with each other.

It should be noted that the present technology can have the following configurations.

(1) A three-dimensional screen structure, on which image light projected from an image light source is incident, the three-dimensional screen structure including:

particles that are three-dimensionally disposed and capable of transmitting or reflecting the image light; and a bind unit that binds the particles.

(2) The three-dimensional screen structure according to (1), in which the particles are disposed at random.

(3) The three-dimensional screen structure according to (1), in which the particles are disposed regularly.

(4) The three-dimensional screen structure according to (3), in which the particles are disposed such that the number of particles per unit volume is increased toward the inside of the three-dimensional screen structure from a surface thereof.

(5) The three-dimensional screen structure according to any one of (1) to (4), in which the bind unit includes connecting bodies that are each formed into a rod shape or a column shape.

(6) The three-dimensional screen structure according to any one of (1) to (5), in which the bind unit is a transparent body that fills a space among the particles.

(7) The three-dimensional screen structure according to any one of (1) to (6), in which the particles and the bind unit are made of a photo-curable resin.

(8) A three-dimensional image generating system, including:
one or more image light sources capable of projecting image light; and
a three-dimensional screen structure including
particles that are three-dimensionally disposed and capable of transmitting or reflecting the image light, and
a bind unit that binds the particles.

(9) The three-dimensional image generating system according to (8), in which
the one or more image light sources are image light sources that respectively project the image light to the three-dimensional screen structure from different directions.

DESCRIPTION OF SYMBOLS 10 projector
11 image light
20, 30, 40, 60 three-dimensional screen structure
21, 31, 61 particle
25 bind unit
26 connecting body
50 dimensional image generating system
65 transparent body

The invention claimed is:

1. A three-dimensional screen structure, comprising:
particles that are three-dimensionally arranged,
wherein the particles are configured to one of transmit or reflect image light projected from an image light source, and
wherein the image light is incident on the three-dimensional screen structure; and
a bind unit, including a plurality of connecting bodies, configured to bind the particles,
wherein each of the plurality of connecting bodies has one of a rod shape or a column shape.

2. The three-dimensional screen structure according to claim 1, wherein the particles are arranged at random.

3. The three-dimensional screen structure according to claim 1, wherein the particles are arranged regularly.

4. The three-dimensional screen structure according to claim 3, wherein the particles are arranged such that a number of particles per unit volume is increased toward inside of the three-dimensional screen structure from a surface thereof.

5. The three-dimensional screen structure according to claim 1, wherein the particles and the bind unit comprises a photo-curable resin.

6. A three-dimensional image generating system, comprising:
one or more image light sources configured to project image light; and
a three-dimensional screen structure including
particles that are three-dimensionally arranged,
wherein the particles are configured to one of transmit or reflect the image light, and
a bind unit, including a plurality of connecting bodies, configured to bind the particles,
wherein each of the plurality of connecting bodies has one of a rod shape or a column shape.

7. The three-dimensional image generating system according to claim 6, wherein the one or more image light sources are image light sources that respectively project the image light to the three-dimensional screen structure from different directions.

* * * * *